219-121 SR
6/23/87 XR 4,674,683

United States Patent [19]

Fabel

[11] Patent Number: 4,674,683

[45] Date of Patent: Jun. 23, 1987

[54] PLASMA FLAME SPRAY GUN METHOD AND APPARATUS WITH ADJUSTABLE RATIO OF RADIAL AND TANGENTIAL PLASMA GAS FLOW

[75] Inventor: Arthur J. Fabel, Amherst, Mass.

[73] Assignee: The Perkin-Elmer Corporation, Norwalk, Conn.

[21] Appl. No.: 860,165

[22] Filed: May 6, 1986

[51] Int. Cl.[4] .......................... B05B 1/24; B05B 7/10; B05B 1/34; B23K 9/00

[52] U.S. Cl. .......................................... 239/13; 239/80; 239/81; 239/402.5; 239/478; 239/481; 219/76.16; 219/121 PB; 219/121 PQ

[58] Field of Search .................................... 239/79-81, 239/402.5, 405, 477-481, 1, 13; 219/76.16, 121 PL, 121 PA, 121 PB, 121 PQ, 121 P

[56] References Cited

U.S. PATENT DOCUMENTS

| | | | |
|---|---|---|---|
| Re. 25,088 | 11/1961 | Ducati et al. | 219/75 |
| 3,145,287 | 8/1964 | Siebein et al. | 219/75 |
| 3,313,908 | 4/1967 | Unger et al. | 219/76 |
| 3,536,885 | 10/1970 | Mitchell | 219/121 PQ X |
| 3,823,302 | 7/1974 | Muehlberger | 219/121 P |
| 3,851,140 | 11/1974 | Coucher | 219/121 P |
| 3,869,593 | 3/1975 | New et al. | 219/121 P |

*Primary Examiner*—Andres Kashnikow
*Assistant Examiner*—Patrick N. Burkhart
*Attorney, Agent, or Firm*—H. S. Ingham; F. L. Masselle; E. T. Grimes

[57] ABSTRACT

A plasma gun has a hollow generally cylindrical anode nozzle member and coaxially disposed therein a cylindrical cathode member, the members co-acting to form an interior passage for plasma forming gas. At one end, within the body of the gun, the passage comprises an annular gas inlet chamber or plenum proximate to the cathode. Progressing in the direction of flow, the passage is defined as an annular space between the cathode and anode members and then continues through the anode nozzle member to the exterior of the gun body. Plasma-forming gas is introduced inwardly through respective inlets, tangentially and radially into the gas inlet chamber. Means are provided for selectively regulating the respective amounts of gas introduced radially and tangentially to thereby determine the degree of vortical flow of gas through the gun.

14 Claims, 5 Drawing Figures

PLASMA FLAME SPRAY GUN METHOD AND APPARATUS WITH ADJUSTABLE RATIO OF RADIAL AND TANGENTIAL PLASMA GAS FLOW

This invention relates to a plasma gun apparatus and method of its operation which enhance efficiency by improved control of plasma gas flow.

BACKGROUND OF THE INVENTION

Plasma guns may be used, inter alia, for such purposes as thermal spraying. Thermal spraying involves the heat softening of a heat fusible material, such as a metal or ceramic, and propelling the softened material in particulate form against a substrate surface which is to be coated. The heated particles strike the surface and bond thereto. A conventional thermal spray gun such as a plasma gun is used for the purpose of both heating and propelling the particles. In a plasma spray gun, the heat fusible material is supplied to the gun in powder form, typically comprised of small particles: e.g., below 100 mesh U.S. standard screen size to about 5 microns.

In typical plasma systems an electrical arc is created between a water-cooled nozzle (anode) and an adjacently disposed cathode. A selected inert gas, flowing between the electrodes and through the electric arc, is ionized and heated to form a plasma attaining temperatures of up to 15,000 degrees Centigrade. The movement of the gas between the electrodes effectively lengthens the arc and causes more energy to be delivered to the arc. The plasma, constituted of at least partially ionized gas, issuing from the nozzle, resembles an open oxy-acetylene flame.

A plasma "flame" spray gun of the general type with which this invention is concerned is described in U.S. Pat. No. 3,145,287 issued on Aug. 18, 1964 to W. A. Siebein et al. for a "Plasma Flame Generator and Spray Gun". A more recent gun structure of this type is disclosed in U.S. patent application Ser. No. 646,734 filed on Sept. 4, 1984 by Anthony F. Dellassio et al. for a "Nozzle Assembly for Plasma Spray Gun" assigned to the same assignee as the present invention. The present invention may be implemented as a modification of the structures disclosed in the Seibein patent or the Dellassio application.

At this juncture it should be understood that "radial" and "tangential" are relative terms and, as used herein, "tangential" includes not only strictly tangential flow but also chordal flow, i.e., flow having a significant tangential component. Moreover, these terms are used in relation to the axis of a plasma flow path and/or the structure, e.g., a bore or conduit, which defines the path.

Plasma guns customarily are capable of operating with either argon or nitrogen as the primary plasma gas. For argon the gas is introduced into a chamber near the cathode with a tangential component so as to impart a vortical flow to the plasma as described, for example, in U.S. Pat. No. 3,823,302 issued July 9, 1974 to Muehlberger for "Apparatus and Method for Plasma Spraying". The reason for so doing is that, absent the vortex, the arc is not carried far enough down the nozzle, (i.e., not sufficiently lengthened by gas flow) to achieve the desired high arc voltage and efficiency.

On the other hand, radial gas flow input as described in the aforementioned U.S. Pat. No. 3,145,287 is generally used with nitrogen because it is less readily ionized and vortical flow with its tendency to extend the arc a long distance down the nozzle causes difficult starting of the arc.

However, without a vortex, the arc voltage and efficiency are low for nitrogen. Therefore, a secondary gas such as hydrogen is often added to the nitrogen, having the effect of facilitating the starting while permitting efficient operation without a vortex. The hydrogen is added after the arc is started. Controlling the hydrogen secondary gas necessarily entails complications and cost to the spraying operation as well as requiring special precautions against explosion.

Even with a vortex the efficiency for argon is undesirably low. Hydrogen is again resorted to as an additive where possible, but that gas is often considered undesirable because of its flammability and its causing embrittlement in the sprayed coating. Helium is an alternative but is expensive and less effective.

Generally, each plasma spray gun is set up for a particular type of plasma-forming gas, either with a radial or a tangential inlet. Guns that may be used for either primary gas typically have different gas distribution rings selectively inserted near the cathode for providing either radial or tangential flow; this requires disassembly when a change in gases is made. Several efforts have been made to simplify the change. U.S. Pat. No. 3,313,908 discloses a plasma torch with two types of gas inlet ports for different gases that are selected alternatively by means of either of two external gas conduit fittings. This method still requires changing those gun fittings and does not provide for adjusting the degree of vortical flow.

U.S. Pat. No. 3,851,140, issued Nov. 26, 1974 to Coucher for "Plasma Spray Gun and Method for Applying Coatings on a Substrate", shows a plasma spray gun with a gas distribution ring having primary openings slanted toward the axis of the gun and secondary openings tangentially oriented. The two sets of inlet openings function simultaneously. This ring is said to control alteration of the gas flow, but there is no means to alter the flow for different gases without changing rings, nor is there means to change the flow configuration during operation.

In U.S. Patent Reissue No. 25,088 reissued Nov. 21, 1961 to A. C. Ducati et al. for "Plasma-jet Torch Apparatus and Method Relating to Increasing the Life of the Back Electrode", there is depicted a plasma torch in which gas is introduced at two axially separated locations. Near the cathode a radial source is provided for the portion of the arc and associated plasma flowing from the cathode region through a first orifice. A tangential gas source is provided in a separate chamber region of large diameter downstream of the first orifice. These separated gas inlet sources do not provide for gas inlet control in the proximity of the cathode, and the anode and cathode are so widely spaced apart that the arc is very difficult to start. This problem is so serious that the arc must be started by momentarily inserting a conductor such as a piece of graphite between the electrodes. With such electrode separation, there is no way of easily starting the arc by changing gas mixtures or gas flow characteristics.

In view of the foregoing, one object of the present invention is to provide an improved plasma spray method and gun apparatus which can operate efficiently with nitrogen gas alone in a vortical flow, and which is not difficult to start.

Another object of the invention is to provide an easy-starting, high efficiency nitrogen gas plasma flame spray method and gun apparatus which avoids the need for the addition of hydrogen or other gases to the nitrogen in order to improve the starting characteristics.

Further objects and advantages of the invention will be apparent from the following description and the accompanying drawings. For instance, the invention permits the spray gun to be used either with argon or with nitrogen, using either with optimum efficiency and ease in starting.

BRIEF DESCRIPTION OF THE INVENTION

In carrying out the invention, there is provided a plasma spray gun having a cylindrical cathode member and a hollow cylindrical anode nozzle member coaxial therewith and spaced therefrom. The plasma gun has an interior passage for plasma-forming gas having one end extending to the exterior of the gun. The other (inner) end of the passage originates with an annular gas inlet chamber proximate to the cathode and extends in the direction of flow (i.e., downstream) into the space between the cathode and anode members and thence through the anode nozzle member to the exterior of the gun body. The plasma spray method comprises introducing plasma-forming gas, through respective inlets, radially inwardly as well as tangentially into the gas inlet chamber while selectively regulating the respective amounts of each gas introduced radially and tangentially to thereby determine the degree of vortical flow of gas through the gun.

DETAILED DESCRIPTION OF THE INVENTION

Figure 1:
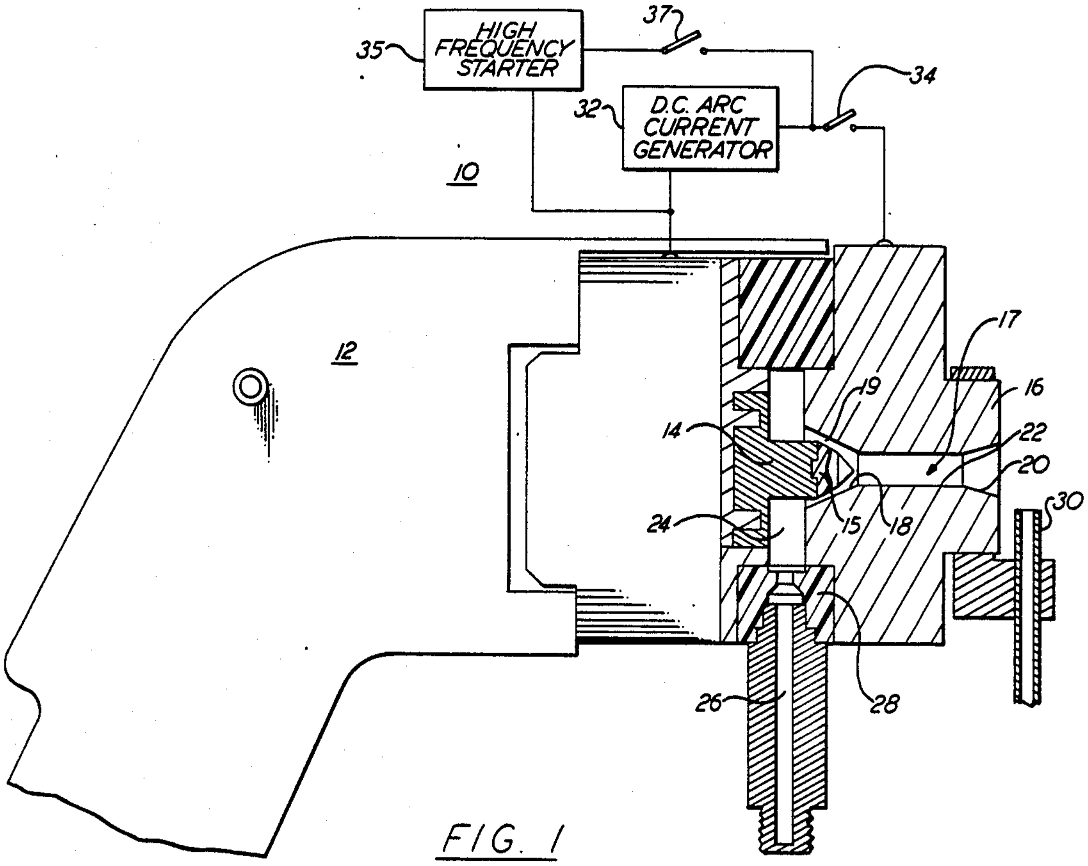
FIG. 1 is a side view, partially in section, of a plasma spray gun structure embodying the present invention.

Referring to the drawings and first, in particular, to FIG. 1, there is shown, partially in section, a flame spray gun structure for carrying out the present invention. The gun structure is designated as a whole by reference number 10, and it may include a handle portion 12, which is only partially shown. Within the interior of the gun is a cathode member 14 which is generally cylindrical in shape except for a conical tip 15 at one end (forward in the direction of flow), and a hollow anode nozzle member 16 containing a through bore 17 of varying configuration and cross-sectional dimension coaxial with the cathode member.

As indicated in the drawing, the nozzle member bore 17 has respective outwardly tapered end portions 18 and 20, and a cylindrical medial portion 22. Tapered end segment 20 from which the plasma flame issues will hereinafter be referred to as the forward or outer end of bore 17 and flared portion 18 as the inner end. The axial length of inner tapered portion 18 of bore 17 is substantially coextensive with the tapered end 15 of cathode member 14. The taper on member 14 is generally complementary to, but of smaller diameter than, the flare of inner end 18 of bore 17 and is coaxially received therein, thus forming an annular gap 19, the inner and outer diametric dimensions of which decrease in the direction (forward) of gas flow.

Within the gun structure, coaxially surrounding the untapered portion of cathode 14, and at a radial distance therefrom, is a gas distribution ring 28 of electrically insulating material which serves to insulate cathode 14 from anode 16 and forms an annular gas inlet chamber or plenum 24 adjoining and in flow communication with the inner (large diameter) end of annular gap 19, thus forming an interior passage for plasma forming gas through bore 17 to the exterior (nozzle) end of nozzle member 16.

Gas is supplied to plenum chamber 24 through inlets, one shown at 26, through ring 28 which thus, in conjunction with plenum 24, forms a gas distribution device.

As will be described more fully in conjunction with FIG. 2, plasma forming gas is introduced through gas distribution ring 28 via at least one radial inlet orifice and at least one tangential inlet orifice. (Only a radial orifice, 26, is shown in FIG. 1.)

A direct current arc generator 32, shown schematically, is connected between the cathode 14 and the anode 16 through an on-off switch 34. A conventional high frequency, high voltage starter 35 with an on-off switch 37 is similarly shown in parallel to current generator 32. When switch 34 is closed, a D.C. potential is impressed between cathode 14 and anode 16. When switch 37 is then closed momentarily to superimpose starter 35, ionization of gas flowing through annular gap 19 initiates plasma formation.

As illustrated symbolically at 30, a powder injection nozzle is provided at the mouth of the anode nozzle 16 for the introduction into the plasma issuing therefrom of a stream of gas-entrained coating particles. The plasma emanating from anode nozzle 16 picks up the gas-entrained coating particles, melts or softens them, and directs them against the surface to be coated.

Since a substantial amount of heat is generated within the plasma gun by the electric arc, the interior of the plasma gun must be cooled; this is conventionally accomplished by circulating a coolant liquid such as water through interior passages of the gun. The interior cooling passages are not illustrated in the drawings as the arrangement of passages is not required to an understanding of the present invention. However, it will be understood that such passages must be provided. Suitable passages are illustrated in related patents such as the aforementioned U.S. Pat. No. 3,145,287, and the aforementioned U.S. patent application Ser. No. 646,734.

Figure 2:
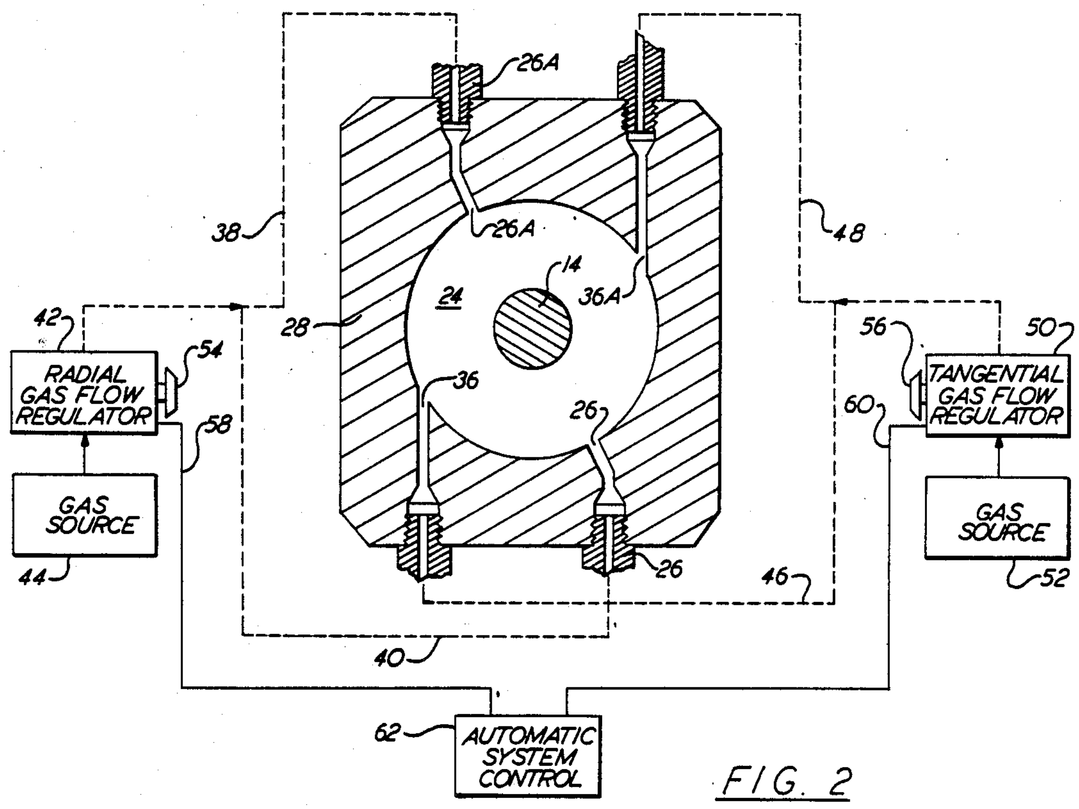
FIG. 2 is a cross-sectional view of a gas distribution ring which forms a part of the plasma spray gun of FIG. 1, and which includes radial and tangential gas inlets, and schematically illustrates separate regulators attached to said gas inlets for regulating the amount of gas delivered through the radial and tangential inlets respectively.

FIG. 2 is a sectional view through gas distribution ring 28 and shows both radial (26,26A) and tangential (36,36A) gas inlet orifices which admit plasma forming gas into plenum 24 surrounding cathode member 14 while a single radial inlet port and a single tangential inlet port are sufficient for the practice of the invention, it is preferred to have multiple ports of each type; accordingly, two of each type are illustrated in FIG. 2. In accordance with the present invention, the radial and the tangential inlet gas flow must be separately controllable. A gas supply system which accomplishes this, schematically shown in FIG. 2, includes radial gas flow lines 38 and 40 which are supplied with gas through a radial gas flow regulator 42 from a gas source 44. Similarly, gas lines 46 and 48 are connected in common to the two tangential gas ports 36 and 36A for supply of gas through the tangential flow regulator 50 from a gas source 52. of course, if the gases supplied to the two different systems are the same, the gas sources 44 and 52 may be combined.

The radial gas flow regulator 42 may be provided with a manual adjustment, as symbolically denoted by an adjustment knob 54. Similarly, the tangential gas flow regulator 50 may be provided with a manual adjustment control as represented symbolically by an adjustment knob 56.

Gas flow regulators 42 and 50 may be automatically controlled through connections indicated at 58 and 60 by an automatic system control 62. Accordingly, either by manual adjustment, or by automatic system control, the respective gas flows may be regulated relative to one another to control the proportion of tangential flow versus axial flow and, according to the degree of vortical flow, of the gas through the gun. If tangential flow is increased relative to radial flow, the degree of vortical flow is concomitantly increased.

It is often desirable to maintain a fixed total rate of gas in order to provide a constant projection of the plasma "flame" from the gun nozzle. Accordingly, when the ratio of the tangential flow to the radial flow is changed, it is often desirable to maintain the same total flow by increasing one and reducing the other. This can be accomplsiehed by means of the automatic system control 62.

One of the most useful modes of operation of the invention is in obtaining a combination of easy starting and high running efficiency. This objective is especially useful when nitrogen is employed as the plasma forming gas. Nitrogen is desirable as a plasma-forming gas because of its chemical inertness and consequent safety, and particularly because of its potential for transferring heat by way of its molecular dissociation and recombination characteristics as a diatomic gas. However, it has been found that it is difficult to start the arc with nitrogen in the presence of a strong vortical gas flow. This difficulty in starting apparently is a result of the increased effective length of the arc path attendant to vortical flow. However, once started, it is desirable to increase the effect length of the arc path by inducing increased vortical flow in order to obtain a higher efficiency of energy transfer from the arc into the gas and thus provide greater heating of the gas.

Accordingly, one of the most useful modes of operation of the present invention is to begin the process with radial flow only, initiating the arc, and then introducing tangential flow; thereafter, increasing the tangential flow component, preferably with proportional decrease in the radial flow component so as to maintain a substantially constant total flow while increasing the energy transfer from the arc to the gas. This mode of operation is especially useful when nitrogen is used as the plasma-forming gas.

Remarkably, the present invention permits the use of nitrogen alone to produce an arc which is easily started while enabling a mode of continuing operation which is highly efficient from a thermal standpont. This represents a significant advantage and economy over the usual arrangement with nitrogen where a gas additive, such as hydrogen, must be used in order to facilitate starting while attaining high efficiency running characteristics.

In the arrangement described above, the power supplied to the gas from the arc is relatively low with radial flow only when the arc is started. However, as the tangential component is increased, the resultant vortical flow through the passage (19) between the electrodes (14,16), and through flow passages 22,20 of the nozzle, gradually increases the length of the arc and thereby increases the voltage and thereby the energy imparted from the arc to the plasma-forming gas. The amount of power delivered to the arc is therefore adjustable by regulating the ratio of the gas introduced tangentially to the gas introduced radially.

The adjustment of the ratio of the radial-to-tangential gas flow also determines the physical position of the arc within the gun nozzle, i.e, the average position where the arc strikes the interior surface of the anode nozzle 16. For instance, it has been found that if the tangential flow is increased enough, it is possible to force the arc to extend the entire length of nozzle passage 17 and to strike or connect with the outer end surface of anode nozzle member 16. The end surface being in open air, this result is deleterious to the end surface, and is not therefore desirable. However, it serves to illustrate what is happening as the arc becomes longer. By changing the ratio of tangential flow, different arc lengths may be selected, and the life of the nozzle may be increased by selectively varying the terminal position of the arc and thereby distributing the wear of the arc on the nozzle.

While a major advantage of the present invention is to permit the efficient operation of a plasma gun with a single gas such as nitrogen, the invention may also be usefully employed with different gases when introduced radially and tangentially. For instance, it is possible to use nitrogen as the primary gas which is introduced radially only, and then to add a secondary gas such as hydrogen by tangential flow after the arc has been started. The hydrogen additive increases the energy taken by the arc, and the tangential flow resulting in vortical flow through the gun passages also increases the energy imparted by the arc so that these two factors operate synergistically to promote efficiency by lengthening the arc. The introduction of separate gases from separate gas sources is illustrated in FIG. 2.

Figure 3:
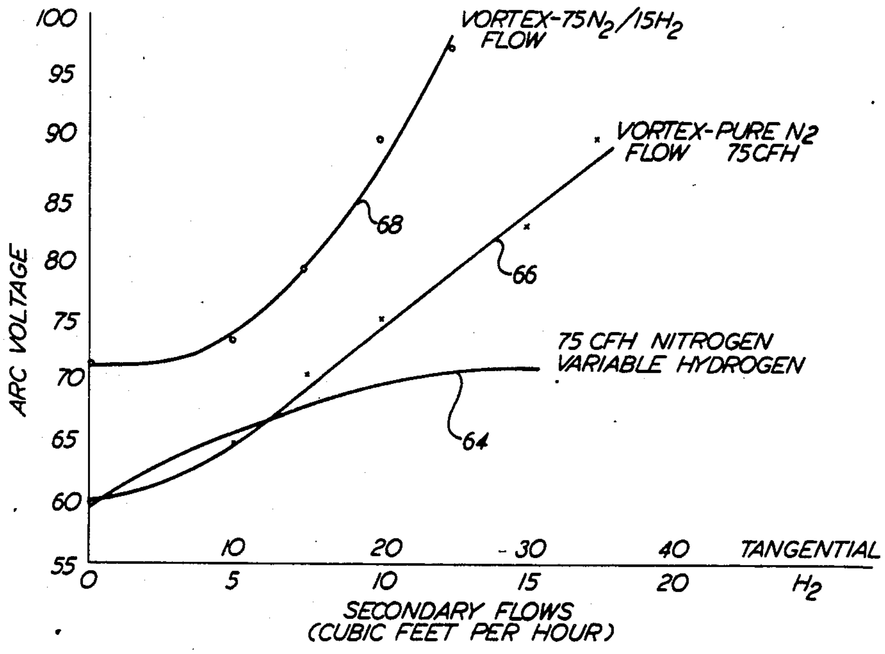
FIGS. 3 and 4 are respective sets of operating curves representative of two different modes of operation of the invention compared with a prior art mode of operation utilizing a combination of nitrogen and hydrogen.
Figure 4:
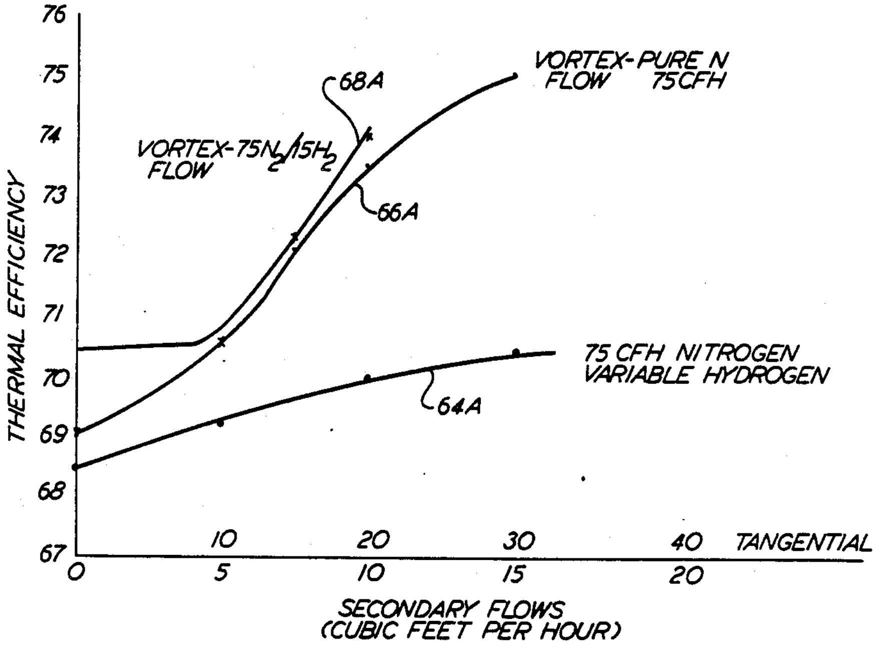

FIGS. 3 and 4 are two sets of curves illustrating operating results in two different modes of operation of the invention compared to a prior art mode of operation employing a combination of nitrogen and hydrogen. FIG. 3 illustrates how the arc voltage varies, and FIG. 4 illustrates how the thermal efficiency varies under different operating conditions.

Referring first to FIG. 3, the lowermost curve 64 illustrates how the operating voltage changes as a function of the addition of hydrogen to the flow of nitrogen as the plasma forming gas, but without any vortex flow. A constant flow of 75 cubic feet per hour of nitrogen was employed, and the hydrogen added was varied according to the lowermost abscissa scale. Thus, the amount of hydrogen was varied from zero up to fifteen cubic feet per hour (CFH), with a resultant increase in the operating voltage to about 70 volts from 60 volts.

By contrast, curve 66 shows how the operating voltage increases with increasing vortex flow using nitrogen only. A total flow of 75 CFH was maintained constant while the proportion of tangential gas flow and consequently the vortex flow was increased. The rate of tangential flow gas is shown by the upper abscissa scale in FIG. 3. Thus, without increasing the total plasma forming gas flow, a substantially higher arc voltage is attainable, as shown by curve 66, by simply adjusting the relative amount of gas delivered to inlet plenum 24 in a tangential flow to provide for an increased vortical flow component in the combined gas stream.

When the same experiment illustrated by curve 66 is repeated with a mixture of 75 CFH nitrogen and 15 CFH hydrogen, the performance results represented by curve 68 are achieved. It is thus seen that both the vortical flow and the addition of hydrogen are operative to increase the arc voltage.

The voltage of the arc is usually closely related to the thermal efficiency of the gun in transferring energy from the arc to the plasma forming gas, namely, high voltage usually indicates higher efficiency. However, it is possible to measure actual thermal efficiency by measuring the electrical power supplied to the arc and by subtracting the amount of power loss from the gun by heat rejection to the coolant water (temperature rise times rate of flow). The difference represents the actual power delivered to the plasma, and effective in the coating process. The thermal efficiency is the ratio of the difference to the power supply. The curves 64A, 66A, 68A in FIG. 4 illustrate the thermal efficiency for each set of the operating conditions previously described respectively with reference to curves 64, 66, and 68 in FIG. 3. In FIG. 4, the same abscissa scales are shown as in FIG. 3.

It is very interesting and remarkable that the efficiency for the pure nitrogen gas flow test illustrated by curve 66A is so much higher than the combination of nitrogen and hydrogen even with vortex flow illustrated by curve 64A. Furthermore, despite the relatively wide separation in the voltage characteristic between curves 66 and 68 in FIG. 3, the thermal efficiency of these two modes of operation is not very different, as illustrated by the close spacing of curves 66A and 68A.

While all of the examples specifically discussed above involve nitrogen, or combinations of nitrogen and hydrogen, it will be understood that this invention is also very useful with other plasma-forming gases such as argon, or with other combinations of plasma forming gases. For instance, use of argon as the primary gas, with nitrogen as the secondary gas, is possible.

Figure 5:
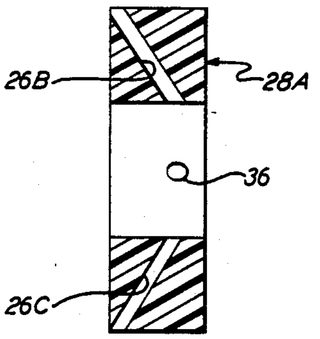
FIG. 5 is a diametral section of a modified embodiment of the distribution ring shown in FIGS. 1 and 2.

As shown schematically in distribution ring 28A in FIG. 5 of the drawings, some or all of the radial flow ports, such as 26B, 26C, may be slanted in their diametral planes so that they make an acute angle with the axis of the electrodes 14,16 so that the radially inner ends of the ports are located forwardly of the radially outer ends, thus to impart a forward axial component to the flow of plasma-forming gas.

In the above description, it has been implied that the so-called "tangential" flow is very clearly defined and identifiable and very distinctive from radial flow. However, it will be understood that any flow which is not absolutely in the radial direction may be considered to have a tangential component. Accordingly, it may be desirable, without departing from the spirit of the present invention, to provide for a gas flow inlet for the tangential inlet port which does not provide the maximum tangential effect upon the entering gas by intentionally aligning that port at some angle between that which would provide a purely radial input and that which would provide the maximum tangential input. Alternatively, the "radial" port may actually have a small tangential component while the "tangential" port has a large tangential component.

Another useful feature of the invention is that a simple change in the controls may be used to change between one hundred percent radial flow, and one hundred percent tangential flow. Radial flow is commonly used with nitrogen and tangential flow is commonly used with argon. Accordingly, the system can be quickly changed from one gas to the other.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

What is claimed is:

1. A plasma generating method for use with a plasma gun having a hollow cylindrical anode nozzle member and a cylindrical cathode member coaxially disposed and spaced relative to one another so as to define an interior passage for plasma-forming gas, said passage having one end extending to the exterior of said gun, an inner end formed by an annular gas inlet plenum proximate to the cathode and an intermediate segment extending between the cathode and anode members, said method including:

introducing plasma-forming gas radially inwardly into the gas inlet plenum and introducing plasma-forming gas with a tangential directional component into the gas inlet plenum while selectively regulating the proportions of gas introduced radially and tangentially to thereby establish, and detemine the degree of, vortical flow of gas through the gun.

2. A method according to claim 1 wherein introduction of said radial and tangential gas is contemporaneous.

3. A method according to claim 1 wherein gas is initially introduced radially only, a voltage is then applied between the cathode and anode members to strike an arc, and gas is then introduced tangentially to establish the vortical flow of gas through the gun.

4. A method according to claim 3 wherein the plasma-forming gas consists essentially of nitrogen.

5. A method according to claim 1 including the additional steps of applying a voltage between the cathode and the anode members to strike an arc, and adjusting the ratio of the gas introduced tangentially to the gas introduced radially to thereby control the amount of power delivered to the arc.

6. A method according to claim 1 including the additional steps of applying a voltage between the cathode and anode members to strike an arc after the gas flow is established, and then adjusting the ratio of the gas introduced tangentially to the gas introduced radially to thereby control the length or physical position of the arc within the gun nozzle.

7. A method as claimed in claim 1 wherein different gases having different ionization characteristics are introduced radially and tangentially respectively.

8. The method of claim 1 further comprising inversely varying the radial and tangential gas flows while holding the total gas flow constant.

9. A plasma generating system including a plasma gun comprising:

a gun body having a hollow cylindrical anode nozzle member and a cylindrical cathode member disposed therein and spaced therefrom, so as to form a passage in the gun and extending to the exterior of the gun, for flow of plasma-forming gas, said anode and cathode nozzle members coacting to enable generation of a plasma-forming arc in said passage, the inner end of said passage being formed by an annular gas inlet plenum proximate to said cathode member and extending between said spaced cathode and anode members and through said anode nozzle member; gas distribution means disposed within said plasma gun body to introduce plasma-forming gas into said gas inlet plenum, said gas distribution means including at least one radial inlet orifice and at least one tangential inlet orifice extending into and terminating in said chamber, the radial and tangential flow of plasma-forming gas through said respective inlet orifices interacting to produce a vortical flow of gas through said gas passage; respective regulating means for controlling the amount of gas flowing through said radial and tangential inlet orifices; and means for adjusting said regulating means relative to one another to control the degree of vortical flow versus axial flow of the gas through said gas passage.

10. A system according to claim 9 wherein said gas distribution means includes a plurality of radial inlet orifices and a plurality of tangential inlet orifices spaced around the circumference of said gas inlet plenum.

11. A system according to claim 9 wherein a substantial portion of the space between said cathode and anode nozzle members is an annulus and wherein there is a substantial axial overlap of said hollow cylindrical anode nozzle member with said cathode member.

12. A system according to claim 11 wherein said annulus has a small radial dimension in order to promote the initiation of an arc discharge therebetween.

13. A system according to claim 12 including means for introducing gas-entrained coating particles into the stream of plasma emanating from said nozzle member and downstream from said cathode member.

14. The plasma system of claim 9 wherein said radial inlet orifice is aligned substantially radially inwardly toward the center axis of said cathode but slanted in a plane common to said axis to provide a forward axial component of movement to said gas.

* * * * *